United States Patent [19]

Murray

[11] 4,136,281

[45] Jan. 23, 1979

[54] ENERGY FLUENCE METER FOR X-RAYS

[75] Inventor: Kenneth M. Murray, Falls Church, Va.

[73] Assignee: The United States of America as represented by the Secretary of the Navy, Washington, D.C.

[21] Appl. No.: 841,515

[22] Filed: Oct. 12, 1977

[51] Int. Cl.$^2$ ............................................. G01T 1/16
[52] U.S. Cl. .................................... 250/336; 250/370; 250/394
[58] Field of Search ............... 250/336, 366, 370, 385, 250/394, 402, 472, 473, 474, 475, 483, 486

[56] References Cited

U.S. PATENT DOCUMENTS

| | | |
|---|---|---|
| 2,983,819 | 5/1961 | Bigelow et al. ............... 250/402 X |
| 3,569,995 | 3/1971 | Mallon et al. ...................... 250/473 |
| 3,790,794 | 2/1974 | Murray et al. .................. 250/370 X |

Primary Examiner—Davis L. Willis
Attorney, Agent, or Firm—R. S. Sciascia; Philip Schneider; Melvin L. Crane

[57] ABSTRACT

An instrument for measuring the energy fluence of a pulsed X-ray field independent of the energy of the photons constituting the field. Separate X-radiation absorption assemblies made of particular materials include separate X-radiation detector means therein and are positioned relative to each other to provide output signals proportional to the energy fluence of the incident radiation. This device will operate over an energy fluence rate range from $10^4$ ergs/cm$^2$ to $10^8$ ergs/cm$^2$ delivered in less than one second.

20 Claims, 7 Drawing Figures

ENERGY FLUENCE METER FOR X-RAYS

BACKGROUND OF THE INVENTION

This invention relates to X-ray detectors and more particularly to a system for measuring the energy fluence of an X-ray field whose energy is greater than 0.10 MeV but less that 100 MeV.

X-ray detectors have been used heretofore to measure the dose an X-ray field produces in some particular measuring device. The measured dose is assumed to be the same as the dose the field produced in an object under irradiation. These prior-art measurements are rather accurate for biological objects or dosimeters specifically designed to simulate biological objects. However, in most other instances, and even in the above case, if accuracy is required, one must calculate the energy fluence of the field by use of an elaborate numerical integration which requires a knowledge of the incident spectrum. The incident spectrum is not usually known very accurately. Once the energy fluence is known, one can then calculate the radiation does at some point in the object which was irradiated. Energy fluence is the quotient of the sum of energies (exclusive of rest mass) of all of the particles entering a sphere of a particular cross-sectional area over the cross-sectional area.

SUMMARY OF THE INVENTION

This system includes two X-radiation detector assemblies having substantially flat responses over adjacent X-radiation energy bands. The responses are summed to provide an overall response which is independent of the X-radiation energies over a much larger range than is possible with either alone. This system gives the energy fluence of pulses of an X-radiation field independent of its spectrum. In addition, the two assemblies provide a quotient related to the relative amounts of high and low energy fluence in the X-radiation spectrum. Therefore the system is useful for monitoring the output of a wide variety pulsed X-ray machines.

DETAILED DESCRIPTION

Figure 1:
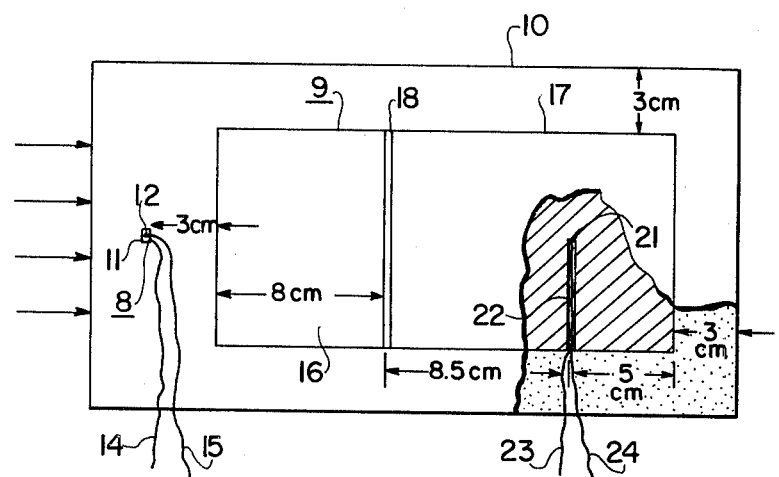
FIG. 1 is a diagrammatic view of a device for measuring energy fluence of a pulsed X-ray field.
Figure 2:
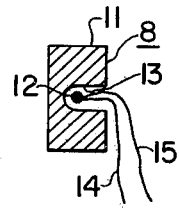
FIG. 2 is an enlarged view of a detector assembly used in the device shown in FIG. 1.
Figure 5:
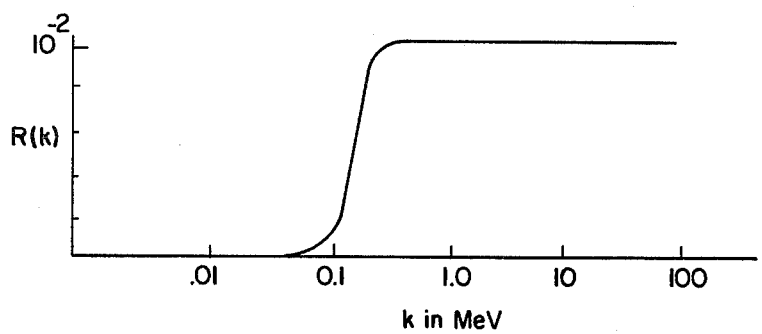
FIG. 5 is a response function curve of an X-ray detector for absorber thicknesses of 20 cm of carbon, 2 mm of iron, and 20 cm of aluminum.

FIG. 1 shows an embodiment of the invention which includes two X-radiation detector assemblies 8 and 9 assembled within a thermal insulating plastic foam housing 10 such as STYROFOAM for example. The assemblies are shown assembled with their centers on a center line through the housing with assembly 8 positioned to receive incident radiation prior to that of assembly 9. Thus, the radiation direction is from left to right in FIG. 1. Each of the assemblies is made from selected materials of a particular thickness that produces charged secondary particles from incident primary X-radiation. The assemblies are shown on the center line of the housing, however, the assembly 8 need not be on the center line of the housing. The type of materials, thickness, etc. are determined by setting up a computer program to calculate the response function for a wide variety of materials and thicknesses. The assemblies are then formed from the selected materials and thicknesses such that a response function is produced which does not vary greatly with respect to energy up to about 100 MeV and which cuts off fairly sharply below 100 KeV as shown in FIG. 5.

Figure 3:
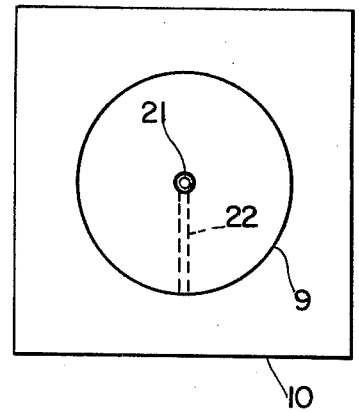
FIG. 3 is a diagrammatic view showing the cross sectional shape of the large assembly in FIG. 1.

X-rays incident on a material manifest their presence by the production of charged secondary particles produced within the body of the material. These electrically charged secondaries may be detected directly by suitable means such as semiconductor diodes, to provide information proportional to the energy deposited by the incident primary X-rays. As radiation is absorbed by matter it heats the matter adiabatically. If the time during which the radiation is absorbed is sufficiently short compared to the time required for the heat to leak away then a measure of the temperature change will accurately reflect the heat added. Thus, this deposited energy may alternatively be detected by simply measuring the temperature change of the material produced by the absorption of the kinetic energy of the charged secondaries. In either of the above cases, the detectors produce an electrical output which is proportional to the energy deposited in the material by the incident primary X-radiation. In the device shown by illustration in FIG. 1, assembly 8 is formed by a rectangular block of iron 11 having a thickness of 2mm with a detector means 12 located at the center of the block through an axial opening 13. A pair of electrical conductors 14, 15 are connected to the detector means and passes through the opening in the block and out through the housing to the outside. The iron block 11 is shown spaced 3 cm from the assembly 9. Assembly 9 is formed in the shape of a 10 cm diameter cylinder made up of an 8 cm long block of graphite 16 which is separated or spaced from a 13½ cm long aluminum cylinder 17 by a 3 mm thick iron disc 18. A detector means 21 is assembled on the axis of the cylinder in the aluminum section 8.5 cm from the iron disc 18. The detector 21 is assembled through a radial opening 22 and a pair of electrical conductors 23 and 24 are connected to the detector means and passes out through the housing. Each of the detectors 12 and 21 connect electrically with any appropriate current amplifier and current indication device. The change in this current indication is proportional to the energy deposited in the material by the incident primary X-radiation. The plastic foam housing 10 is rectangular as shown in FIG. 3 and is of sufficient thickness to prevent any heat to escape from the assemblies to the outside medium or for the assemblies to be affected by the outside medium.

It should be noted that the above dimensions and materials are typical for a thermistor type of detector and are not to be considered limiting, other dimensions and materials may be used. As pointed out above, instead of thermistors, semiconductor diodes such as silicon and germanium may be used.

Assembly 8 is small and blocks very little radiation from assembly 9. Assembly 8 is made of a material that absorbs the incident radiation totally only for the low energy part of the spectrum. That is from 0 to about 0.08 MeV at which point the detection falls off quickly to zero.

Assembly 9 modifies the X-radiation spectrum as it penetrates to the detector embedded in the assembly such that the detector responds only to the part of the X-radiation above the low energy range. Therefore, the assembly 8 is referred to as a total-absorption X-radiation detector assembly and the assembly 9 is referred to as a partial-absorption X-radiation detection assembly.

The operation of the system will be explained using thermistors as the detection means in assemblies 8 and 9. In operation, a pulse of X-ray radiation is incident on the assemblies 8 and 9 from the direction of the arrows in FIG. 1 which heats the structure in accordance with the energy in the X-ray field. Each of the thermistors 12 and 21 generates a change in current proportional to the heat absorbed by its respective assembly due to the incident X-radiation. Each current output is separately amplified and indicated by a suitable current indicator which has previously been calibrated to zero without the presence of any incident X-radiation. The changes in these outputs are summed and this sum is used to determine the energy fluence of the X-ray field.

The International Committee on Radiation Units, ICRU, defines the energy fluence, $\psi$, of particles as the quotient of dE over da and dE is the sum of the energies, exclusive of rest mass, of all the particles entering a sphere of cross section da.

$$\psi = dE/da \tag{1}$$

If the particles are photons and they are traveling in one direction only, e.g., a plane wave, then one can write $$\frac{dE}{da} = \int_0^\infty k\phi(K)\,dk \tag{2}$$

Where k is the photon energy and $\phi(k)$ is the flux of photons of energy, k, per unit energy in one direction.

Figure 4:
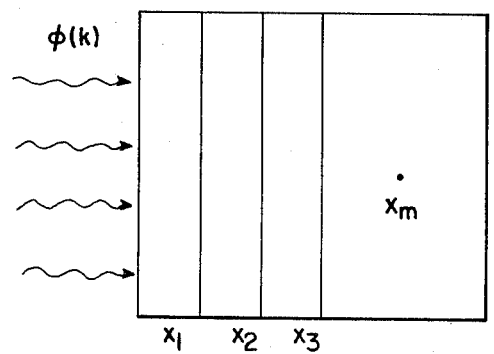
FIG. 4 illustrates an X-ray field incident on a medium consisting of semi-infinite slabs of different material of thicknesses $X_1$, $X_2$ and $X_3$, with a point at $X_m$ at which a measurement of energy disposition is made.

By definition, an energy fluence meter for X-rays is a device which provides an output proportional to the integral set forth in equation (2) above. In achieving this, consider the structure of FIG. 4. As noted, X-rays are incident normal to the X = 0 plane. They enter a medium comprising semi-infinite slabs of thicknesses, $X_1$, $X_2$, etc., with a point at $X_m$ at which a measurement of energy deposition is to be made. The incident X-ray field has an energy fluence, $k\phi(k)$, for each particular energy, k. The energy deposited per unit area in a thickness $\Delta X$ at $X_m$ can be written as $$\Delta E_m = \int_0^\infty k\phi(k)\,e^{-a}(1-e^{-b})dk \tag{3}$$

where $a = \Sigma_i (\frac{\mu(k)}{\rho})_i X_i$; and $b = (\frac{\mu(k)}{\rho})_m \Delta X$.

The expression $e^{-a}$ is the attenuation of the energy fluence by the intervening layers of different materials, and $\mu(k)/\rho$ is the mass absorption coefficient where $\mu(k)$ represents the fraction of the energy removed from the beam per centimeter of path and $\rho$ is the density of the material. The thickness of the layer i is $X_i$ in units of mass per unit area. Taking $\Delta X$ to be small one obtains $$\Delta E_m = \int_0^\infty k\phi(k)\left(\frac{\mu(k)}{\rho}\right)_m \Delta X e^{-a} dk. \tag{4}$$

Since $\Delta X$ does not depend on k one can divide by $\Delta X$ giving the dose per unit area, $D_m$, at $X_m$ as, $$D_m = \frac{\Delta E_m}{\Delta X} = \int_0^\infty k\phi(k)\left(\frac{\mu(k)}{\rho}\right)_m e^{-a} dk. \tag{5}$$

Now defining the response function, R(k) as;

$$R(k) = \left(\frac{\mu(k)}{\rho}\right)_m e^{-a} \tag{6}$$

It can be written $$D_m = \int_0^\infty k\phi(k)R(k)dk. \tag{7}$$

If stacks of material are constructed such that R(k) is equal to some constant, K, for all photon energy, k, i.e., $$R(k) = K \text{ for all } k, \tag{8}$$

then one can write $$\int_0^\infty k\phi(k)\,dk = \frac{D_m}{K}. \tag{9}$$

By measuring $D_m$ and by calculating K from the definition of R(k) one will have the value of the integral of equation (2) i.e., the energy fluence.

The following describes how one achieves the conditions for R(k) to be reasonably independent of k by a calorimetric measurement of D. Calorimetric measurement may be made using a calorimeter such as set forth in U.S. Pat. No. 3,790,794.

As radiation is absored by matter, it heats the matter. If the time during which the radiation is absorbed is sufficiently short compared to the time required for the heat to leak away, then a measure of the temperature change will accurately reflect the heat added.

Let Q be the heat added to a mass m. Then one can write $$\Delta Q = 0 \,\Delta m C_p \,\Delta T, \tag{10}$$

where $\Delta T$ is the temperature change and $C_p$ is the specific heat of the material absorbing the radiation. Considering the geometry of FIG. 4, the area of the slab at $X_m$ is written as A. Then the total energy added to the slab is $\Delta Q$ and $$\Delta Q_m = E_m A, \tag{11}$$

Hence $$D_m = \frac{\Delta E_m}{\Delta X} = C_p \,\Delta T. \tag{12}$$

This means that, if one places a small temperature sensor at $X_m$ and measures the change in temperature, one can calculate the dose per unit area at that point.

The response function, R(k), was defined in equation (6) as $$R_m(k) = \left(\frac{\mu(k)}{\rho}\right)_m e^{-a} \tag{13}$$

By setting up a computer program to calculate $R_m(k)$ for a wide variety of materials, i, and thicknesses, $X_i$, one can produce a response function which does not vary greatly with respect to energy up to about 100 MeV and which cuts off fairly sharply below 100 keV. FIG. 5 shows such a response function in which the average value of the response function comes out to be near $10^{-2}$.

This result is useful but a great many X-ray fields have much of their spectrum below 0.1 MeV. To measure this region one can use a small thickness of material which will be totally absorbing up to some energy, say around 0.08 MeV and then drop off rapidly with increasing energy. The response function for such a system is $$R_1(k) = 1 - e\left(\frac{\mu(k)}{\rho}\right)_1 \Delta X_1 \tag{14}$$

where $X_1$ is the thickness of the absorber. The value of $R_1(k)$ for total absorption is 1. One can however multiply $R_m(k)$ by a coefficient of about 100 and add this to the previously caliculated $R_1(k)$.

$$R(k)_{total} = R_1(k) + ZR_m(k), \tag{15}$$

where Z is about 100. One now calculates $R_{total}$ by computer while varying the thicknesses of materials of $R_1$ as well as of $R_m$ until one gets a response function, $R_{total}$, something like FIG. 6.

Figure 6:
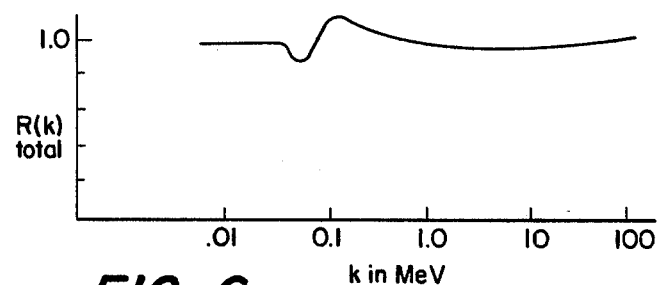
FIG. 6 is a total response function curve for a total absorption calorimeter of iron and a partial absorption calorimeter with carbon, iron, and aluminum absorbers such as shown in FIG. 1.

With such a response function as is shown in FIG. 6, one can break up the integral in Equation (7) as follows:

$$D_{total} = \int_A^B k\Phi(k)R_1(k)dk + \int_B^C k\Phi(k)R_m(k)dk. \tag{16}$$

provided $\Phi(k)$ is zero for $k < A$ and $> C$; and, $$D_{tot} = D_1 + D_m, \tag{17}$$

where, $$D_1 = \int_A^B k\phi(k)R_1(k)dk \tag{18}$$

and $$D_m = \int_B^C k\phi(k)R_m(k)dk. \tag{19}$$

If one takes $R_1 = 1$ for $A < k \leq B$ and zero elsewhere and takes $R_m = K$ for $B < k$ and zero elsewhere, then it can be written $$\int_A^B k\phi(k)dk = D_1 \tag{20}$$

and $$\int_B^C k\phi(k)dk = \frac{D_m}{K}. \tag{21}$$

Since $\phi(k)$ is 0 for $k < A$ and $> C$ one can write that $$\Psi = \int_0^\infty k\phi(k)dk = D_1 + \frac{D_m}{K}. \tag{22}$$

Equation 22 is the fundamental instrument equation. The quantity $D_1$ is the output measurement of the detector means 12 and the quantity $D_m$ is the output measurement of the detector means 21 in the assembly of FIG. 1. The constant K is calculated from the definition of $R_m(k)$. The accuracy of this equation depends on how smoothly the two response functions $KR_1$ and $R_m$ can be added together. The error can be estimated for any known spectrum $K \phi (k)$, by folding it into $R_{tot}$ as defined by Equation (15).

It has been shown above that by use of a computer, the response function $R_m(k)$ for a wide variety of materials may be determined so that a detector in an energy fluence meter for X-rays may be made by use of different thicknesses of different materials. The materials and dimensions shown herein are illustrative and are believed to be the best choice providing a balancing convenience of construction against accuracy of measurement.

The calorimetric technique is limited to fluences greater than $10^4$ ergs/cm$^2$ in short pulses. Thermistors may be replaced by silicon and germanium diodes as detectors in a similar configuration to that shown in FIG. 1 and described above. Such instruments will be sensitive to energy fluence per unit time as well as total energy fluence and be sensitive to lower energy levels.

The device herein described uses the responses of two assemblies so as to make their sum independent of energy over a much larger range than is possible with either alone. The device operates to determine the energy fluence of an X-ray field independent of its spectrum and enables one to make a qualitative evaluation of the spectrum. These responses alert a user of the device to changes in the X-ray field conditions or machine operations whereby corrective measures may be undertaken.

Figure 7:
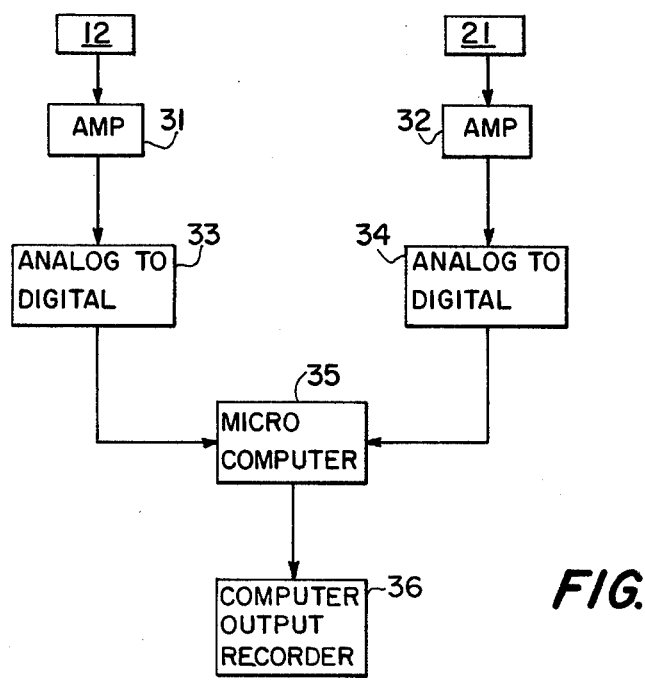
FIG. 7 illustrates the detector system including a computer for determining energy fluence.

The above described X-radiation detector assemblies may be used in conjunction with a computer, as shown in FIG. 7, for directly computing the energy fluence of an X-ray field. In such a system, the output of detector means 12 and 21 is separately amplified by a suitable amplifier 31, 32 and directed into an analog-to-digital converter 33, 34. The outputs from the analog-to-digital converters are fed into a microcomputer base 35 which has been programmed to record the changes in these outputs and to solve the formula 22, noted above. The computer printout will be a digital printout of the energy fluence of a pulsed X-ray field.

The computer may also be programmed to solve the ratio of the changes in outputs of the two detectors to provide the ratio of the energy fluence above 0.08 MeV to that below 0.08 MeV provided the photons are in the energy range.

Obviously many modifications and variations of the present invention are possible in light of the above teachings. It is therefore to be understood that within the scope of the appended claims the invention may be practiced otherwise than as specifically described.

What is claimed and desired to be secured by Letters Patent of the United States is:

1. In a portable X-ray detector system for determining energy fluence of an X-ray field comprising:
   a first assembly,
   said first assembly made of a material for absorbing incident X-radiation totally only for the low-energy part of the spectrum;
   first detector means embedded within said first assembly at its center for producing an output signal proportional to X-radiation energy deposited in said first assembly by incident primary X-radiation;
   a second assembly;
   second detector means embedded within said second assembly on a longitudinal axis for producing an output signal proportional to X-radiation energy deposited in said second assembly by incident primary X-radiation;
   said second assembly made of materials which modify the X-radiation spectrum as it penetrates said materials to said second detector means such that said second detector means responds only to a portion of incident X-radiation greater than said low energy part; and
   a thermal insulating housing,
   said first and second assemblies embedded within said thermal insulating housing, said first assembly being positioned relative to said second assembly to receive incident X-radiation prior its receipt by said second assembly.

2. In a system as claimed in claim 1 wherein:
   said first and second detector means are temperature sensors.

3. In a system as claimed in claim 2 wherein:
   said first and second detector means are thermistors.

4. In a system as claimed in claim 1 wherein:
   said first and second detector means are semiconductors.

5. In a system as claimed in claim 4 wherein:
   said semiconductors are silicon and germanium.

6. In a system as claimed in claim 1 wherein
   said system has a total response function which varies very little with respect to X-radiation in the energy range of 10 keV to 100 MeV.

7. In a system as claimed in claim 1 in which:
   said first assembly is made of iron.

8. In a system as claimed in claim 7 wherein:
   said second assembly is formed by cylinders of graphite and aluminum separated by a disc of iron, and said second detector means is positioned in said aluminum cylinder on the linear axis thereof.

9. In a system as claimed in claim 8 wherein:
   said system has a total response function which varies very little with respect to X-radiation in the energy range of 10 kev to 100 MeV.

10. In a system as claimed in claim 1 wherein;
    said second assembly is formed by cylinders of graphite and aluminum separated by a disc of iron, and said second detector means is positioned in said aluminum cylinder on the linear axis thereof.

11. In a system as claimed in claim 1 wherein:
    the ratio of the output signal of said first detector means to that of said second detector means determines the quality of the energy spectrum.

12. In a system as claimed in claim 1 wherein:
    the outputs of said first and second detector means are adjusted and combined to achieve an overall response proportional to an incident X-ray energy fluence which does not depend strongly upon the incident spectrum.

13. A portable X-ray detector system for determining energy fluence of an X-ray field comprising:
    a first assembly;
    said first assembly made of a material for absorbing incident X-radiation totally only for the low energy part of the spectrum;
    first detector means embedded within said first assembly at its center for producing an output signal proportional to X-radiation energy deposited in said first assembly by incident primary X-radiation;
    a second assembly;
    second detector means embedded within said second assembly on a longitudinal axis for producing an output signal proportional to X-radiation energy deposited in said second assembly by incident primary X-radiation,
    said second assembly made of materials which modify the X-radiation spectrum as it penetrates said materials to said second detector means such that said second detector means responds only to a portion of incident X-radiation;
    a thermal insulating housing,
    said first and second assemblies embedded within said thermal insulating housing such that said first assembly is positioned relative to said second assembly to receive indicent X-radiation prior to that of said second assembly,
    amplifier means for amplifying the output signals from said first and second detector means;
    analog-to-digital converter means for receiving said amplified output signals from said first and second detector means and producing a digital output;
    a microcomputer base programmed to solve the equation $\psi = D_1 + (D_m/K)$ during processing said digital output from the output of said first and second detector means where $\psi$ is the energy fluence, $D_1$ is the change in the digital output from said second detector means, $D_m$ is the change in the digital output from said second detector means and K is a constant stored in said computer; and
    a recorder for recording the output from said computer which output is the energy fluence of the X-radiation indicent on said first and second assemblies.

14. A system as claimed in claim 13 wherein:
    said first and second detector means are temperature sensors.

15. A system as claimed in claim 14 wherein:
    said first and second detector means are thermistors.

16. A system as claimed in claim 13 wherein:
    said first and second detector means are semiconductors.

17. A system as claimed in claim 16 wherein:
    said semiconductors are silicon and germanium.

18. A system as claimed in claim 13 wherein:
    said first assembly is made of iron.

19. A system as claimed in claim 18 wherein:
    said second assembly is formed by cylinders of graphite and aluminum separated by a disc of iron, and said second detector means is embedded in said aluminum cylinder on the linear axis thereof.

20. A system as claimed in claim 13 wherein:
    said second assembly is formed by cylinders of graphite and aluminum separated by a disc of iron, and said second detector means is embedded in said aluminum cylinder on the linear axis thereof.

* * * * *